PASSIVE CONFERENCE CIRCUIT

Filed Sept. 20, 1956

INVENTOR:
JAMES S. S. KERR,
PETER G. SMEE,
BY Robert J. Steinmeyer
HIS ATTORNEY.

United States Patent Office 2,882,339

Patented Apr. 14, 1959

2,882,339

PASSIVE CONFERENCE CIRCUIT

Peter G. Smee, North Syracuse, and James S. S. Kerr, Syracuse, N.Y., assignors to General Electric Company, a corporation of New York Application September 20, 1956, Serial No. 610,980

14 Claims. (Cl. 179—1)

This invention relates to passive conference circuits and more particularly to passive conference circuits designed for minimum attenuation of desired signals and minimum power loss.

It is well known in the prior art to utilize impedance networks having passive elements in order to interconnect more than two transmitter-receiver sets in a conference circuit. The majority of the prior art circuits, in order to reduce cross-talk, operate on the principle of attenuating the transmitted signal from a particular transmitter when it appears back across its associated receiver to a greater degree than it is attenuated when it is transmitted to the remainder of the receivers in the network. This type of treatment of the problem results in fairly large total power loss in the circuits employed and at the same time does not completely eliminate cross-talk. In many circuits it is necessary to provide further amplification of the signals to offset the attenuation resulting from the attempt to eliminate cross-talk. This adds bulky and expensive active elements to the passive elements employed.

It is also known in the art, where it is desired to interconnect three transmitter-receiver sets, to employ a Y-delta type of connection wherein the transmitters are connected in "delta" and their associated receivers are connected in Y from the corners of the "delta" or vice-versa. Each receiver is connected to the corner of the "delta"-connected transmitters opposite to that of its associated transmitter. This type of system presents a null condition across the receiver associated with the transmitter which is transmitting at any particular time for any passive operating condition.

A problem long existing in the art has been to connect more than three transmitter-receiver sets in a manner which would not attenuate the transmitted signals objectionably and which would at the same time eliminate cross-talk between a particular transmitter and its associated receiver. The existence of this problem is apparent when we consider the large number of interconnection circuits employing modifications of the attenuation principles previously discussed. Accordingly, it is an object of our invention to provide a passive conference circuit employing more than three transmitter-receiver sets in which attenuation is minimized and cross-talk substantially eliminated.

It is another object of our invention to achieve the above-delineated results utilizing a minimum number of components and connections.

Still another object of our invention is to provide a novel passive conference network in which as many as five or more transmitter-receiver sets may be connected.

A further object of our invention is to provide a novel circuit wherein any transmitter-receiver set may be replaced by equivalent dummy impedances, when this transmitter and receiver are not to be used, in order to maintain a balanced, symmetrical network.

A still further object of our invention is to connect one transmitter or one receiver to a group of receivers or transmittters, respectively, in a manner minimizing attenuation.

Our invention will be better understood from the following description taken in connection with the accompanying drawing and its scope will be pointed out in the appended claims.

In carrying out our invention in one form thereof, five transmitters are connected in a closed series loop. Each of these transmitters has an associated receiver which is connected in parallel across the two transmitters most remote in the loop from its associated transmitter. The transmitters and receivers are so designed as to present substantially equal impedances to the network so that during operation of any one of the transmitters a null condition will exist across its associated receiver with respect to the signal transmitted for any passive operating condition.

In the drawings,

Fig. 3 is a block diagram depicting a circuit in which Fig. 1 is employed.

Figure 1:
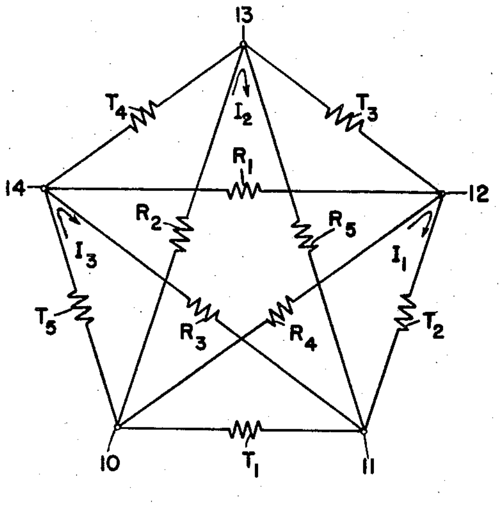
Fig. 1 is a schematic circuit diagram of one form of our invention.

Referring to Fig. 1, it can be seen that five transmitters, designated as $T_1$, $T_2$, $T_3$, $T_4$, and $T_5$ are connected in a closed, series loop. Five associated receivers, designated as $R_1$, $R_2$, $R_3$, $R_4$, and $R_5$ respectively, are shown connected in parallel with the two transmitters most remote in the loop from the transmitter associated with each receiver. For example, $R_1$ is connected across transmitters $T_3$ and $T_4$, which are the two transmitters most remote in the loop from transmitter $T_1$. Each of these transmitters and receivers is designed to present substantially equal impedances to the network for any passive operating condition.

If transmitter $T_1$ is energized so that the potential at point 10 is plus one volt and the potential at point 11 is minus one volt, then the potential at points 12, 13, and 14 will be zero volts, since each of these points lies on the center of a potential divider between the points 10 and 11, the remainder of the circuit also being symmetrical. Since the points 12, 13, and 14 are at the same potential, or zero volts, no current will flow in receiver $R_1$ or transmitters $T_3$ and $T_4$. Equal currents will flow from the point 10 to the point 12 to the point 11, from the point 10 to the point 13 to the point 11 and from the point 10 to the point 14 to the point 11, since the impedances of these parallel branches are equal. These currents are illustrated in the drawing as $I_1$, $I_2$, and $I_3$ respectively. The remaining receivers $R_2$, $R_3$, $R_4$, and $R_5$ will be actuated equally by transmitter $T_1$. Also current will flow in transmitters $T_2$ and $T_5$ and therefore additional power will be dissipated.

In the method of operation described, transmitter $T_1$ presents a null condition across receiver $R_1$. This null condition arises in branches which will be hereinafter referred to as conjugate branches. This transmitter and its associated receiver in conjugate branches form what is called a transmitter-receiver or T–R pair. The attenuation of the network can be derived as follows. Attenuation in decibels is equal to ten times the logarithm to the base ten of the ratio of the power of the transmitter to the power dissipated in a particular receiver, or $$\alpha = 10 \log_{10} \frac{P_T}{P_R} \qquad (1)$$

where $\alpha$=attenuation in db $P_T$=power delivered by a transmitter $P_R$=power dissipation in a single receiver The voltage across a transmitter is twice that across any single receiver and the current thru the transmitter is three times that thru any receiver so the power ratio becomes $$\frac{P_T}{P_R}=\frac{E_T I_T}{E_R I_R}=\frac{(2E_R)(3I_R)}{E_R I_R}=6 \qquad (2)$$

where $E_R$=the voltage across a receiver
$I_R$=the current thru a receiver
$E_T=2E_R$, the voltage across the transmitter
$I_T=3I_R$, the current thru the transmitter Additional power loss occurs due to the inability to achieve optimum conditions. Taking the transmitter impedance as R the total impedance of the three parallel branches across the transmitter is ⅔R.

The power to the load is $$P_R=I^2R_2 \qquad (3)$$

where $R_2$ is the equivalent load impedance. We then have:

$$P_R=\left(\frac{V}{R+R_2}\right)^2 R_2 \qquad (4)$$

$$=V^2\frac{R_2}{(R+R_2)^2}$$

Taking a partial derivative we get $$\frac{\partial P_R}{\partial R_2}=\frac{1}{(R+R_2)}2-\frac{2R_2}{(R+R_2)^3} \qquad (5)$$

$$=\frac{R-R_2}{(R+R_2)^3} \qquad (5^1)$$

When Equation $5^1$ is equated to zero, we have the condition for optimum power transmitted to the load, and this occurs for $R=R_2$. Putting this condition into Equation 4 we obtain $$P_R=V^2\frac{R}{(2R_2)^2}=\frac{V^2}{4R} \qquad (6)$$

This yields the optimum power and the attenuation figure must account for the difference between this and the actual power. Now, $$\frac{P\text{ optimum}}{P\text{ actual}}=\frac{\frac{V^2}{4R}}{\frac{V^2}{\left(R+\frac{2}{3R}\right)^2\frac{2R}{3}}}=\frac{25}{24} \qquad (7)$$

Thus the attenuation of this network in decibels is equal to $$\alpha=10\log_{10}6\times\frac{25}{24}$$
$$=10\log_{10}6.25$$
$$=10\times.79588$$
$$=7.96\text{ decibels}$$

This amount of attenuation, including that due to mismatch, is not large enough to seriously hamper the operation of the network and is considerably less than attenuations of 15 db or more experienced in the passive circuits of the prior art employing five or more sets. It is obvious that if we desire to place matching impedances in the network, so that for instance a transmitter or receiver would always see 600 ohms looking in, additional attenuation would be experienced. It is desirable to do this, for example, when standard transmitters and receivers are employed which are best matched at 600 ohms or some other predetermined value.

In the event that fewer than five people wish to confer on the conference circuit, dummy impedances, substantially equal to the transmitter and receiver impedances employed, may be inserted in place of the transmitter and receiver elements at the points in the network which are desired to be made inoperative. This will preserve the symmetry of the network and yield the same operating characteristics as if all transmitters and receivers were in use.

It is apparent from the symmetry of the network that the network is not limited to the mode of operation described above wherein the points 10 and 11 require equal and opposite potentials. These values have only been used as a convenient example. If, for instance, the point 10 were at zero volts and the point 11 at two volts, the points 12, 13, and 14 would each be at one volt and again no current would flow in receiver $R_1$ or transmitters $T_3$ and $T_4$. These conditions exist for any voltage value across transmitter $T_1$.

It can be seen that the network described above provides a convenient passive conference circuit in which a minimum number of elements and connections are necessary and a minimum amount of attenuation is experienced.

Figure 2:
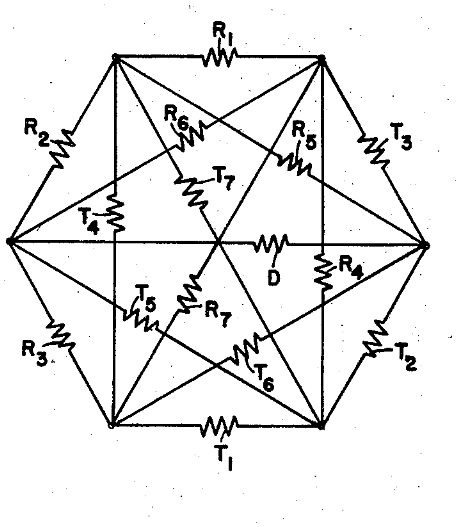
Fig. 2 is a passive network having six sides.

Turning now to Fig. 2 there is shown an alternative embodiment of the invention in which the connections form a six sided polygon having all the diagonals connected. In this figure the transmitters are again designated $T_1$ through $T_7$ having associated receivers $R_1$ through $R_7$ respectively. In order to achieve the desired null at a given receiver when its associated transmitter is transmitting, the connections are made as shown. Three T–R pairs are connected each with its respective transmitter and associated receiver on opposite sides of the polygon. Three T–R pairs are connected each with its respective transmitter and associated receiver on opposite minor diagonals as shown. The remaining pair is connected to two of the major diagonals. Dummy impedance D, is connected in the other major diagonal in order to complete the symmetry of the circuit. This dummy impedance will cause some additional power loss. Again as in the circuit of Fig. 1 a signal transmitted from any of the transmitters will appear as a null across its associated receiver. However, in addition the signal from transmitter $T_7$ will not be received on receiver $R_2$. It may not be desired to use the seventh set.

For certain applications in which it is desired that attenuation be reduced, it may be desired to connect a single transmitter to a group of receivers or vice-versa. This may be done using our interconnection circuit by positioning the transmitter element and then locating receiver elements at all or most of the points or in all branches of the circuit which do not receive a null signal from a voltage generated in the branch where the transmitter is located. The remainder of the branches may contain dummy impedances, but still the attenuation is less than that normally experienced by using a separate padding impedance with each element, as is conventionally done when impedance matching is desired and all the branches are paralleled.

The teachings of our invention can be readily extended to a series of regular polygons with all of the corners connected together by diagonals. A generalized expression for this is $$d=\frac{n^2-3n}{2}$$

where $d$ is the total number of diagonals and $n$ is an integer defining the number of sides of the polygon. Also, $$b=d+n=\frac{n^2-n}{2}$$

where $b$ is the total number of branches involved. The number of major diagonals is $$d_m=\frac{n}{2}$$

P, the number of conjugate pairs of branches, cross-coupled, equals $b/2$ for small $n$ for even $b$ and $$\frac{b-1}{2}$$

for odd $b$ up to $n=7$. For $n=8$ or larger $p$ is $2n-3$. The impedance in each branch, which is equal in all branches, is $$Z_b = Z_o + Z_s = Z_o\frac{(2n-4)}{n}$$

where $Z_0$ is the desired operating impedance (in and out) and $Z_s$ is the series impedance for each pair for a desired $Z_0$. The impedance looking into any branch is $$Z_i = \frac{2Z_b}{n-2}$$

also, $$Z_s = Z_o\frac{(n-4)}{n}$$

When voltage is applied across one branch the number of active branches across which an output voltage will appear is $b_a=2n-4$. The number of passive branches is $$b_p = \frac{n^2-5n+8}{2} - r$$

where $r$ is the number of redundant branches. The output voltage is $$E_o = \frac{E_i}{2}$$

where $E_i$ is the input voltage. The attenuation due to mismatch correction in decibels is $$\alpha_m = 20\log_{10}\left(\frac{2}{n-2}\right)$$

and the total attenuation from the input to the output is $$\alpha_t = 20\log_{10}\left(\frac{1}{n-2}\right)$$

Optimum characteristics of attenuation are achieved in the configuration shown in Figure 1 where there are no unusable or redundant branches.

Figure 3:
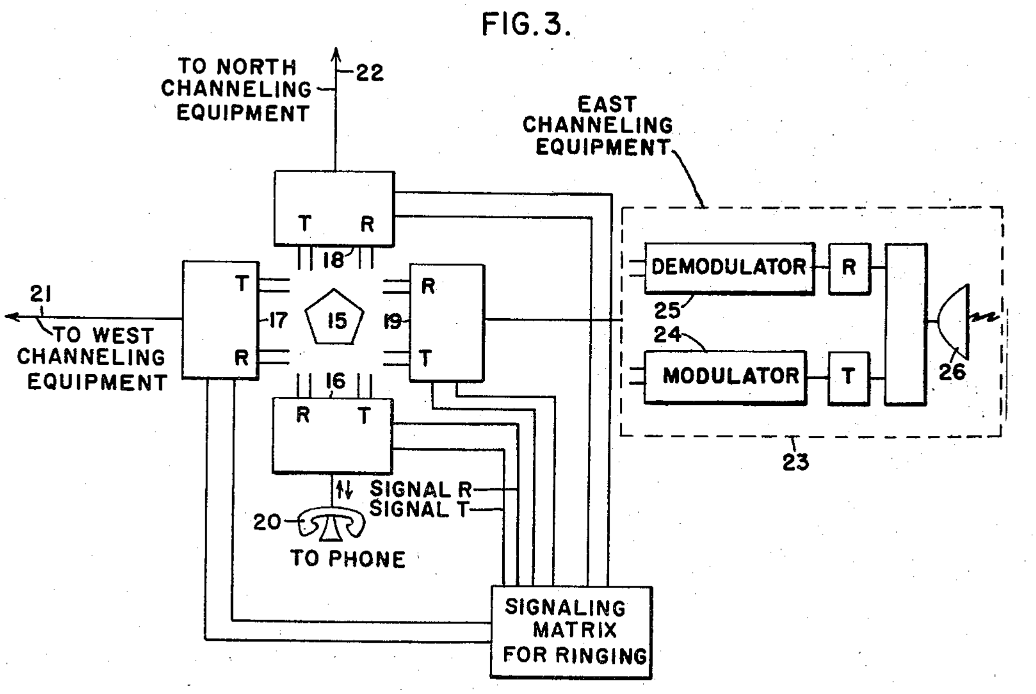

Turning now to Fig. 3 where we have described the use of the configuration of Fig. 1 in microwave equipment the pentagon having all diagonals connected, hereinafter called the pentastar 15, can be seen in the center of the figure. This pentastar interconnection is similar to that illustrated in Fig. 1. Surrounding pentastar 15 are four T–R pairs 16, 17, 18, and 19 which are connected to conjugate branches of the pentastar 15, in the manner hereinbefore described, the specific connections not being shown in Fig. 3. Obviously then, one pair of conjugate branches of pentastar 15 will contain dummy impedances for this circuit configuration. T–R pair 16 is connected to local phone 20. T–R pairs 17 and 18 are shown leading to "west" and "north" channeling equipment respectively. This equipment is shown in block form associated with T–R pair 19 in the "east" channeling equipment 23, which consists of a modulator and demodulator 24 and 25 respectively, leading to and from the T–R pair 19 through appropriate circuitry to the antenna 26. A signalling matrix 27 is also shown connected to T–R pairs 16, 17, 18 and 19 to provide for ringing respective associated channels.

It can readily be seen that by selecting a proper value of $n$, in the foregoing equations, any number of T–R pairs and associated channeling sets of equipment may be utilized in a circuit of this nature. Also it is obvious that the positions of the transmitters and receivers could be reversed in all configurations and that certain of the transmitters could be replaced by receivers or vice-versa.

While we have shown particular embodiments of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. In combination, a plurality of transmitters in excess of three each having an associated receiver, means electrically connecting said transmitters and receivers in separate branches of a circuit, said circuit defining a closed polygon with all diagonals joined, any of said transmitters and its associated receiver being connected in conjugate branches of said circuit, the branches in which said connections are made including both said diagonals and the sides of said polygon, whereby during operation of any one of said transmitters it will present a null condition across its associated receiver.

2. In combination, a plurality of transmitters in excess of three each having an associated receiver, a circuit electrically connecting said transmitters and receivers in separate branches of a closed polygon having all diagonals joined, any of said transmitters and its associated receiver being connected in conjugate branches of said circuit, the branches in which said connections are made including both said diagonals and the sides of said polygon, whereby during operation of any one of said transmitters it will present a null condition across its associated receiver and equally activate the remaining receivers.

3. In an intercommunication system having five transmitters each having an associated receiver, a circuit electrically connecting said transmitters and receivers, said circuit comprising a pentagon having all diagonals joined, any one of said transmitters and its associated receiver being connected in conjugate branches of said circuit, the branches in which said connections are made including both said diagonals and the sides of said pentagon, whereby during operation of said one of said transmitters it will present a null condition across its associated receiver and equally activate the remaining receivers.

4. In an intercommunication system having at least five transmitters each having an associated receiver, a circuit electrically connecting said transmitters and receivers in separate branches of a closed polygon having all diagonals joined, any one of said transmitters and its associated receiver being connected in conjugate branches of said circuit, the branches in which said connections are made including both said diagonals and the sides of said polygon, whereby during operation of said one of said transmitters it will present a null condition across its associated receiver and equally activate the remaining receivers.

5. In combination, five transmitters each having an associated receiver, said transmitters and receivers each having substantially equivalent passive impedances for any operating condition, a circuit electrically connecting said transmitters and receivers in separate branches of a pentagon having all diagonals joined, any one of said transmitters and its associated receiver being connected in conjugate branches of said circuit, the branches in which said connections are made including both said diagonals and the sides of said polygon, whereby during operation of said one of said transmitters it will present a null condition across its associated receiver and equally activate the remaining receivers.

6. In combination, five transmitters each having an associated receiver, said transmitters being electrically connected in a closed series loop, and each of said receivers being electrically connected in parallel across the two transmitters most remote in said loop from the transmitter with which it is associated whereby during operation of any one of said transmitters it will present a null condition across its associated receiver and equally activate the remaining receivers.

7. In combination, five transmitters each having an associated receiver, said transmitters and receiver each having substantially equivalent passive impedances for any operating conditions in order to minimize attenuation, said transmitters being electrically connected in a closed series loop, and each of said receivers being electrically connected in parallel across the two transmitters most remote in said loop from the transmitter with which it is associated whereby during operation of any one of said transmitters it will present a null condition across its associated receiver and equally activate the remaining receivers.

8. In combination; a closed series loop of five elements consisting of at least two transmitters and the remainder of dummy impedances, each of said five elements having an associated element; said associated element associated with each of said transmitters being a receiver and said associated element associated with each of said dummy impedances being a dummy impedance; said transmitters, receivers and dummy impedances each presenting an equivalent passive impedance to the combination; and each of said associated elements being electrically connected in parallel across the two of said five elements most remote in said loop from the one of said five elements with which it is associated, whereby during operation of any one of said transmitters it will present a null condition across its associated receiver and equally activate the remaining receivers.

9. A microwave communication circuit comprising in combination, a local phone for transmitting and receiving connected to a transmit-receive pair, a plurality of sets of channeling equipment in excess of two each connected to a transmit-receive pair, a circuit connecting said transmit-receive pairs, said circuit comprising a closed polygon with all its diagonals connected, each branch of said circuit containing either a transmit or a receive part of said pairs or an equivalent dummy impedance, said pairs being located in symmetrically conjugate branches of said circuit providing connections between any transmitter and its associated receiver whereby during operation of any one of said transmitters it will present a null condition across its associated receiver.

10. A microwave communication circuit comprising in combination, a local phone for transmitting and receiving connected to a transmit-receive pair, a plurality of sets of channeling equipment in excess of two each connected to a transmit-receive pair, a circuit connecting said transmit-receive pairs, said circuit comprising a closed polygon with all its diagonals connected, each branch of said circuit containing either a transmit or a receive part of said pairs or an equivalent dummy impedance, said pairs being located in symmetrically conjugate branches of said circuit providing connections between any transmitter and its associated receiver whereby during operation of any one of said transmitters it will present a null condition across its associated receiver and a signaling matrix connected to each transmit-receive pair associated with said channeling equipment for selectively ringing a desired channel.

11. A combining network for reducing attenuation comprising a group of elements in excess of four, a conjugate element for each element of said group, an interconnection circuit for said elements and said conjugate elements, said circuit forming a closed polygon of greater than four sides having all diagonals connected, said elements and their respective conjugate elements each being connected in a separate symmetrical conjugate branch of said circuit so that a voltage generated at any element will appear as a null across its associated conjugate element and dummy elements connected in any remaining branch of said circuit in order to complete the symmetry thereof to establish conjugacy relationship.

12. A combining network comprising a closed polygon having at least five sides, said polygon having all its diagonals connected, a separate circuit element connected in each branch of said network, said circuit elements comprising a plurality of symmetrically conjugate pairs having substantially equal passive impedances and the remainder of dummy impedances equal to the passive impedance of each element of said pairs, said conjugate pairs being connected in conjugate branches of said network whereby a voltage present at one element of said pairs will appear as a null across its conjugate and the attenuation due to interconnecting said elements will be minimized.

13. The network of claim 12 in which one of said elements is a transmitter, the remaining elements and conjugate elements comprising receivers and dummy impedances.

14. The network of claim 12 in which one of said elements is a receiver, the remaining elements and conjugate elements comprising transmitters and dummy impedances.

References Cited in the file of this patent

UNITED STATES PATENTS 2,035,536 Cowan ---------------- Mar. 31, 1936